United States Patent
Tahara et al.

(10) Patent No.: US 8,691,004 B2
(45) Date of Patent: Apr. 8, 2014

(54) METHOD OF INK-JET RECORDING, PRETREATMENT LIQUID, INK SET, AND INK-JET RECORDING APPARATUS

(75) Inventors: Ai Tahara, Nagoya (JP); Goro Okada, Nagoya (JP); Ryuji Kato, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 317 days.

(21) Appl. No.: 12/726,368

(22) Filed: Mar. 18, 2010

(65) Prior Publication Data

US 2010/0302307 A1 Dec. 2, 2010

(30) Foreign Application Priority Data

May 29, 2009 (JP) ................................. 2009-130248

(51) Int. Cl.
*C09D 1/00* (2006.01)
(52) U.S. Cl.
USPC ...................................... 106/157.6
(58) Field of Classification Search
USPC .................. 427/210, 261, 288; 106/157.6
See application file for complete search history.

(56) References Cited

U.S. PATENT DOCUMENTS

| 5,106,416 | A | * | 4/1992 | Moffatt et al. | ............. | 106/31.43 |
| 5,116,409 | A | | 5/1992 | Moffatt | | |
| 5,609,671 | A | | 3/1997 | Nagasawa | | |
| 5,837,045 | A | | 11/1998 | Johnson et al. | | |
| 7,384,461 | B2 | | 6/2008 | Kawai et al. | | |
| 2004/0104988 | A1 | | 6/2004 | Sawada | | |
| 2005/0235871 | A1 | * | 10/2005 | Kato et al. | ................. | 106/31.86 |
| 2006/0197814 | A1 | * | 9/2006 | Doi | ............................ | 347/100 |
| 2007/0279445 | A1 | | 12/2007 | Yamashita | | |
| 2010/0080910 | A1 | | 4/2010 | Okada | | |
| 2010/0080911 | A1 | | 4/2010 | Okada | | |

FOREIGN PATENT DOCUMENTS

| JP | 08-003498 | 1/1996 |
| JP | 2000-513396 | 10/2000 |
| JP | 2003-182203 A | 7/2003 |
| JP | 2004-306403 | 11/2004 |
| JP | 2006-088438 | 4/2006 |
| JP | 2006-241279 | 9/2006 |
| JP | 2007-176966 | 7/2007 |
| JP | 2007-326242 | 12/2007 |
| JP | 2010-083030 A | 4/2010 |
| JP | 2010-083031 A | 4/2010 |

OTHER PUBLICATIONS

US Office Action mailed Jun. 29, 2012, U.S. Appl. No. 12/564,955.
Final Office Action in U.S. Appl. No. 12/564,944 dated Oct. 10, 2012.
Final Office Action in U.S. Appl. No. 12/564,955 dated Sep. 21, 2012.

(Continued)

*Primary Examiner* — Michael Cleveland
*Assistant Examiner* — Alex A Rolland
(74) *Attorney, Agent, or Firm* — Banner & Witcoff, Ltd.

(57) ABSTRACT

The present invention provides a method of ink-jet recording that includes the steps of pretreating by applying a pretreatment liquid onto a recording medium in advance of ink-jet recording, and recording by ejecting a pigment ink onto the recording medium by an ink-jet method. The pretreatment liquid includes the following components (i) and (ii), and water.
Component (i): at least one of succinic acid and acetic acid
Component (ii): alkali metal halide

16 Claims, 3 Drawing Sheets

(56) References Cited

OTHER PUBLICATIONS

US Office Action mailed May 21, 2012, U.S. Appl. No. 12/564,944.
Non-Final Office Action in U.S. Appl. No. 12/564,944 dated Jun. 29, 2013.
Non-Final Office Action in U.S. Appl. No. 12/564,955 dated Jan. 2, 2013.
Final Office Action in U.S. Appl. No. 12/564,944 dated Jul. 29, 2013.
Final Office Action dated Sep. 12, 2013 in U.S. Appl. No. 12/564,955.

* cited by examiner

FIG. 1
(A) 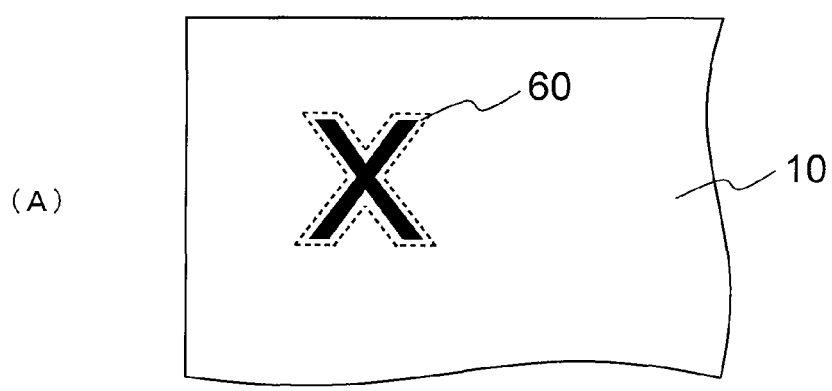
(B) 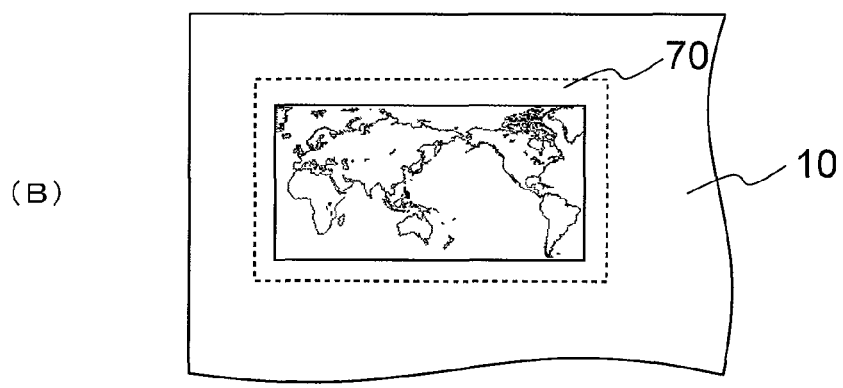

METHOD OF INK-JET RECORDING, PRETREATMENT LIQUID, INK SET, AND INK-JET RECORDING APPARATUS

CROSS-REFERENCE TO RELATED APPLICATION

This application claims priority from Japanese Patent Application No. 2009-130248 filed on May 29, 2009. The entire subject matter of the Japanese Patent Application is incorporated herein by reference.

BACKGROUND

With the aim of improving recording quality of ink-jet recording, application of a pretreatment liquid to a recording paper has been conducted by preparing the pretreatment liquid separately from an ink. For example, pretreatment liquids containing aggregating agents have been disclosed. By applying the pretreatment liquid onto an area to be recorded of the recording paper in advance of recording with an ink, an optical density of a recorded object is improved. However, in the aforementioned method, improvement of the optical density of the recorded object is insufficient.

SUMMARY

A method of ink-jet recording comprises the steps of pretreating by applying a pretreatment liquid onto a recording medium in advance of ink-jet recording, and recording by ejecting a pigment ink onto the recording medium by an ink-jet method. The pretreatment liquid comprises the following components (i) and (ii), and water.
Component (i): at least one of succinic acid and acetic acid
Component (ii): alkali metal halide
A pretreatment liquid is for applying onto a recording medium in ink-jet recording using a pigment ink in advance of the ink-jet recording. The pretreatment liquid comprises the following components (i) and (ii), and water.
Component (i): at least one of succinic acid and acetic acid
Component (ii): alkali metal halide
An ink set comprises a pigment ink and the pretreatment liquid.
An ink-jet recording apparatus comprises an ink storing portion and an ink ejecting unit, an ink stored in the ink storing portion being ejected by the ink ejecting unit. The ink-jet recording apparatus further comprises a unit for applying the pretreatment liquid.

BRIEF DESCRIPTION OF THE DRAWINGS

FIGS. 1 (A) and (B) are views showing examples of recording by the method of ink-jet recording.

DETAILED DESCRIPTION

Figure 2:
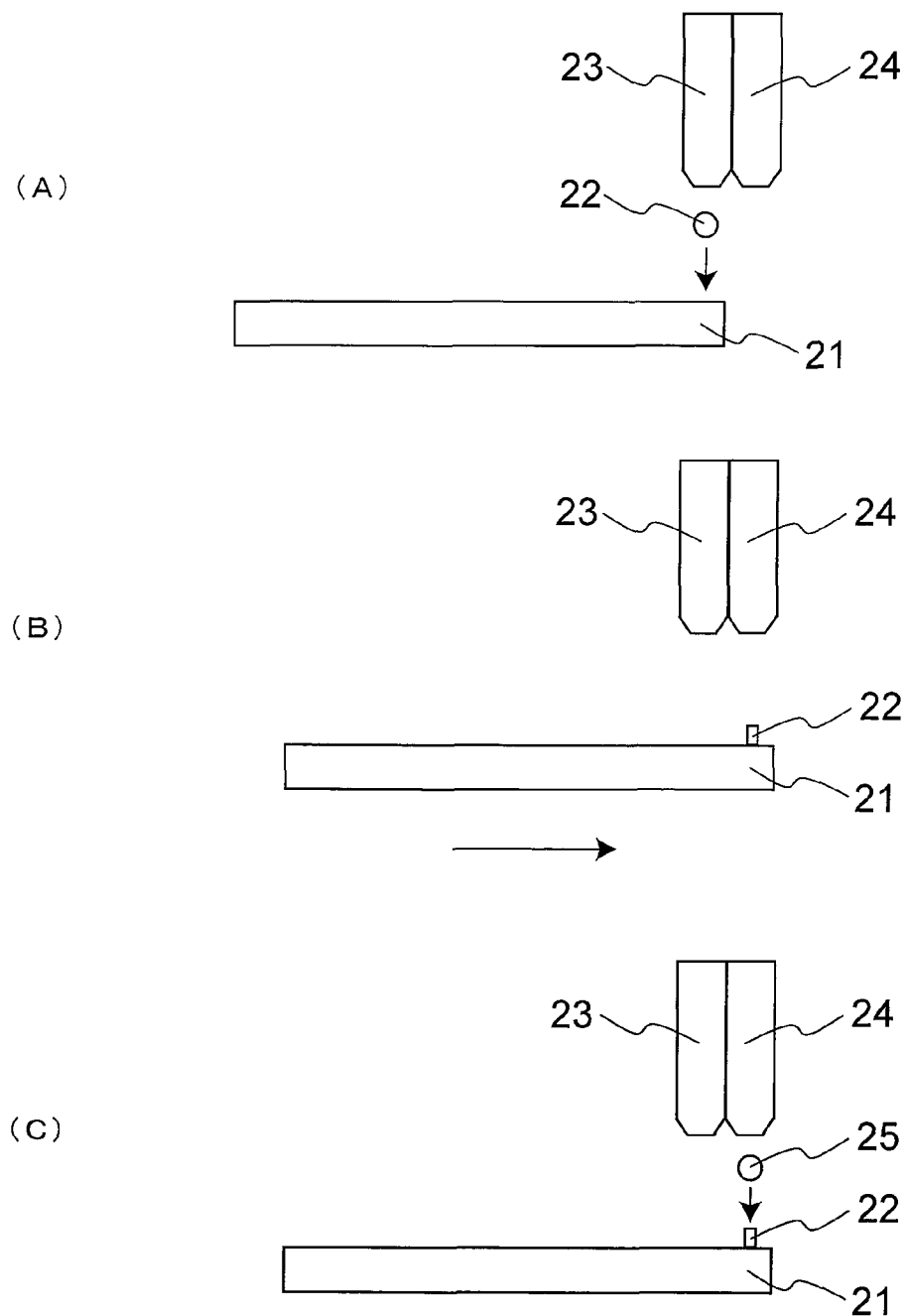
FIGS. 2 (A) to (C) are a process drawing showing an example of a process of the method of ink-jet recording.

The method of ink-jet recording is explained in detail. As described above, the method of ink-jet recording comprises the steps of pretreating and recording.
An objective recording medium to be recorded in the method of ink-jet recording is, for example, a recording paper. The recording paper is, for example, a plain paper. The "plain paper" is a paper, which is not applied with special processing or special treatment on a recording surface thereof, such as a quality paper used for a notebook, a report paper, or the like; an uncoated copy paper; or the like. Examples of the plain paper include "Laser Print" manufactured by Hammermill, "DATA COPY PAPER" manufactured by M-real, "Xerox 4200" manufactured by XEROX CORPORATION, "4200DP PAPER" manufactured by FUJI XEROX OFFICE SUPPLY CO. LTD., and the like.

The step of pretreating is a step of applying a pretreatment liquid onto a recording medium in advance of ink-jet recording.

The pretreatment liquid used in the step of pretreating comprises the components (i) and (ii), and water.

The components (i) and (ii) have functions of aggregating pigments in the pigment ink when the pretreatment liquid and the pigment ink are brought into contact on the recording medium.

The amount of the component (i) to be added with respect to the total amount of the pretreatment liquid is, for example, in the range from about 1 wt % to about 10 wt %, and in the range from about 1 wt % to about 5 wt %.

With respect to the component (ii), examples of the alkali metal include sodium, potassium, lithium, rubidium, cesium, and the like. Examples of the component (ii) include alkali metal fluoride, alkali metal chloride, alkali metal bromide, alkali metal iodide, and the like. Among them, the component (ii) may be alkali metal chloride or alkali metal iodide. Examples of the alkali metal chloride include sodium chloride, potassium chloride, lithium chloride, and the like. Examples of the alkali metal iodide include sodium iodide, potassium iodide, and the like. One of the alkali metal halides may be used alone or two or more of them may be used in combination. The amount of the component (ii) to be added with respect to the total amount of the pretreatment liquid is, for example, in the range from about 1 wt % to about 10 wt %, and in the range from about 1 wt % to about 5 wt %.

The water may be ion-exchange water or pure water. The amount of the water to be added with respect to the total amount of the pretreatment liquid may be, for example, the balance of the pretreatment liquid, excluding other components.

The pretreatment liquid may further comprise glycol ether as a penetrant. The glycol ether may be dipropylene glycol-n-propyl ether (DPP) and diethylene glycol-n-hexyl ether (DEHE). Glycol ether other than DPP and DEHE may be used. Examples of glycol ether other than DPP and DEHE include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, triethylene glycol methyl ether, triethylene glycol ethyl ether, triethylene glycol-n-propyl ether, triethylene glycol-n-butyl ether (BTG), propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-butyl ether, tripropylene glycol methyl ether, tripropylene glycol ethyl ether, tripropylene glycol-n-propyl ether, tripropylene glycol-n-butyl ether, and the like. The amount of the glycol ether to be added with respect to the total amount of the pretreatment liquid is, for example, in the range from about 1 wt % to about 15 wt %, and in the range from about 2 wt % to about 10 wt %. In addition to the components (i) and (ii), the glycol ether, and water, the pretreatment liquid may further comprise other components.

When the pretreatment liquid is applied to a recording surface of the recording medium, an optical density of a recorded object is improved. With respect to a mechanism of improvement of the optical density, the inventors of the present invention presume as follows. That is, when the pretreatment liquid is applied to the recording surface of the recording medium, pigments in a pigment ink are efficiently aggregated on the recording surface of the recording medium by the action of the components (i) and (ii). As a result, the optical density of the recorded object is improved. When the component (i) is used, as compared to the case in which succinate or acetate (for example, sodium acetate or the like) is used, a pH is decreased (a concentration of a hydrogen ion is increased). As a result, aggregation of pigments is increased and thus the optical density is improved. Further, since the pigments are efficiently aggregated on the recording surface, bleeding such as feathering can be decreased. However, these mechanisms are mere presumptions and the present invention is not restricted or limited by these presumptions.

In the step of pretreating, the pretreatment liquid may be applied by an ejecting method, a stamping method, a brushing method, a rolling method, or the like. The ejecting method is a method of applying the pretreatment liquid onto the recording medium by ejecting, for example, by an ink-jet method. The stamping method, the brushing method, and the rolling method are, as the names suggest, methods of applying the pretreatment liquid with a stamp, a brush, and a roller, respectively.

In the step of pretreating, the pretreatment liquid may be applied to the whole or a part of the recording surface of the recording medium. When a part of the recording surface of the recording medium is applied with the pretreatment liquid, at least an area to be recorded, with a pigment ink, of the recording surface of the recording medium is a pretreatment liquid applied area. When a part of the recording surface of the recording medium is applied with the pretreatment liquid, the pretreatment liquid applied area may be larger than the area to be recorded. For example, as shown in FIG. 1 (A), when the letter "X" is recorded on a recording paper 10, a pretreatment liquid may be applied to form a pretreatment liquid applied area 60 having a line width wider than that of the letter. Further, for example, as shown in FIG. 1 (B), when an image is recorded on the recording paper 10, a pretreatment liquid may be applied to form a pretreatment liquid applied area 70 that is larger than the image.

The step of recording is a step of recording by ejecting a pigment ink onto a recording medium by an ink-jet method. The recording includes recording of letters and images; printing; and the like.

As for the pigment ink used in the step of recording, for example, an ink comprising a pigment, water, and a water-soluble organic solvent may be used.

For example, carbon black, inorganic pigments, organic pigments, and the like may be used as the pigment. Examples of the carbon black include furnace black, lamp black, acetylene black, channel black, and the like. Examples of the inorganic pigment include titanium oxide, iron oxide inorganic pigment, carbon black inorganic pigment, and the like. Examples of the organic pigment include azo pigments such as azo lake, an insoluble azo pigment, a condensed azo pigment, a chelate azo pigment, and the like; polycyclic pigments such as a phthalocyanine pigment, a perylene and perynone pigment, an anthraquinone pigment, a quinacridone pigment, a dioxazine pigment, a thioindigo pigment, an isoindolinone pigment, a quinophthalone pigment, and the like; dye lake pigments such as a basic dye lake pigment, an acid dye lake pigment, and the like; a nitro pigment; a nitroso pigment; an aniline black daylight fluorescent pigment; and the like. Further, other pigments may be used as long as they are dispersible to an aqueous phase. Specific examples of the pigments include C. I. Pigment Black 1, 6, and 7; C. I. Pigment Yellow 1, 2, 3, 12, 13, 14, 15, 16, 17, 55, 73, 74, 75, 83, 93, 94, 95, 97, 98, 114, 128, 129, 138, 150, 151, 154, 180, 185, and 194; C. I. Pigment Orange 31 and 43; C. I. Pigment Red 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blue1, 2, 3, 15, 15:1, 15:2, 15:3, 15:4, 16, 22, and 60; C. I. Pigment Green 7 and 36; and the like.

The pigment may include a self-dispersed pigment. The self-dispersed pigment is a pigment that is dispersible to water, without using a dispersant, by introducing at least one of hydrophilic functional groups such as a carboxyl group, a carbonyl group, a hydroxyl group, a sulfonic group, and the like; and their salts to pigment particles directly or through other groups by a chemical bond.

As for the self-dispersed pigment, for example, self-dispersed pigments treated according to the methods described in JP8 (1996)-3498A, JP2000-513396A, and the like, may be used. For example, commercially available self-dispersed pigments may used. Examples of the commercially available self-dispersed pigment include "CAB-O-JET®200", "CAB-O-JET® 250C", "CAB-O-JET® 260M", "CAB-O-JET® 270Y", "CAB-O-JET® 300", "CAB-O-JET® 400", "CAB-O-JET® 450C", "CAB-O-JET® 465M", and "CAB-O-JET® 470Y", manufactured by Cabot Specialty Chemicals, Inc.; "BONJET® BLACK CW-1", "BONJET® BLACK CW-2", and "BONJET® BLACK CW-3", manufactured by Orient Chemical Industries, Ltd.; "LIOJET® WD BLACK 002C", manufactured by TOYO INK MFG. CO., LTD.; and the like.

As a pigment used as a material of the self-dispersed pigment, either an inorganic pigment or an organic pigment may be used. Further, examples of the pigment suitable to perform the aforementioned treatment include carbon blacks such as "MA8" and "MA100", manufactured by Mitsubishi Chemical Corporation; "COLOR BLACK FW 200", manufactured by Evonik Degussa; and the like.

The amount of the pigment to be added with respect to the total amount of the pigment ink (the proportion of the pigment; pigment solid content) is decided suitably according to an optical density, color, or the like desired for a recorded object, for example. The proportion of the pigment is, for example, in the range from about 0.1 wt % to about 20 wt %, and in the range from about 0.3 wt % to about 15 wt %. One of the pigments may be used alone or two or more of them may be used in combination.

The water may be ion-exchange water or pure water. The amount of the water to be added with respect to the total amount of the pigment ink may be, for example, the balance of the ink, excluding other components.

Examples of the water-soluble organic solvent include a humectant and a penetrant. The humectant prevents an ink from drying at a nozzle tip portion of an ink-jet head, for example. The penetrant adjusts a drying rate of an ink on a recording medium, for example.

Examples of the humectant include lower alcohols such as methyl alcohol, ethyl alcohol, n-propyl alcohol, isopropyl alcohol, n-butyl alcohol, sec-butyl alcohol, tert-butyl alcohol, and the like; amides such as dimethylformamide, dimethylacetamide, and the like; ketones such as acetone, and the like; ketoalcohols such as diacetone alcohol, and the like; ethers such as tetrahydrofuran, dioxane, and the like; polyalcohols such as polyalkylene glycol, alkylene glycol, glycerin, and the like; 2-pyrrolidone; N-methyl-2-pyrrolidone; 1,3-dimethyl-2-imidazolidinone; and the like. Examples of the polyalkylene glycol include polyethylene glycol, polypropylene glycol, and the like. Examples of the alkylene glycol include ethylene glycol, propylene glycol, butylene glycol, diethylene glycol, triethylene glycol, dipropylene glycol, tripropylene glycol, thiodiglycol, hexylene glycol, and the like. One of the humectants may be used alone or two or more of them may be used in combination. Among them, for example, the humectant may be polyalcohols such as alkylene glycol, glycerin, and the like.

The amount of the humectant to be added with respect to the total amount of the pigment ink is, for example, in the range from 0 wt % to about 95 wt %, in the range from about 5 wt % to about 80 wt %, and in the range from about 5 wt % to about 50 wt %.

An example of the penetrant includes glycol ether. Examples of the glycol ether include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. One of the penetrants may be used alone or two or more of them may be used in combination.

The amount of the penetrant to be added with respect to the total amount of the pigment ink (the proportion of the penetrant) is, for example, in the range from 0 wt % to about 20 wt %. Setting of the proportion of the penetrant in the pigment ink in the aforementioned range makes it possible to obtain suitable penetrability of the pigment ink relative to a recording medium such as a recording paper. The proportion of the penetrant may be in the range from about 0.1 wt % to about 15 wt %, and in the range from about 0.5 wt % to about 10 wt %.

The pigment ink may further comprise a conventionally known additive(s), if necessary. Examples of the additive include a surfactant, a viscosity modifier, a surface tension modifier, a mildewproofing agent, and the like.

Examples of the viscosity modifier include polyvinyl alcohols, celluloses, water-soluble resins, and the like.

The pigment ink may be prepared, for example, by uniformly mixing the pigment, water, the water-soluble organic solvent, and optionally other added components by a conventionally known method, and then removing sediments with a filter or the like.

Ink-jet recording in the step of recording may be performed by ejecting a pigment ink onto a recording medium using an ink-jet head.

For example, first, as shown in FIG. 2 (A), a pretreatment liquid 22 is ejected from a nozzle 23 of an ink-jet head onto an area to be recorded of a recording surface of a recording paper 21 to form a pretreatment liquid applied area. Next, as shown in FIG. 2 (B), the recording paper 21 is moved in the direction of the arrow. Then, as shown in FIG. 2 (C), recording is performed by ejecting a pigment ink 25 onto the pretreatment liquid applied area using a nozzle 24 of the ink-jet head. Pigments in the pigment ink 25 are aggregated by the action of the components (i) and (ii) in the pretreatment liquid 22, and as a result, a recorded object with a high optical density is obtained.

According to the present invention, a pretreated recording medium, which is formed by applying the pretreatment liquid onto at least an area to be recorded of the recording surface of the recording medium, is obtained.

Next, the ink-jet recording apparatus is explained. As described above, the ink-jet recording apparatus comprises an ink storing portion and an ink ejecting unit, and an ink stored in the ink storing portion is ejected by the ink ejecting unit. The ink-jet recording apparatus further comprises a unit for applying the pretreatment liquid. Except for these, the ink-jet recording apparatus may have a configuration similar to that of, for example, a conventionally known ink-jet recording apparatus.

The ink-jet recording apparatus may be an ink-jet recording apparatus to which a line-type ink-jet head is mounted. However, the ink-jet recording apparatus is not limited thereto. The ink-jet recording apparatus may be, for example, an ink-jet recording apparatus to which a serial-type ink-jet head is mounted. The line-type ink-jet recording apparatus performs recording in the width direction of the recording medium all at once, using a line-type ink-jet head having a recording width equal to or wider than the width of the recording medium, in a condition where the ink-jet head is fixed. In contrast, the serial-type ink-jet recording apparatus performs recording by moving the ink-jet head itself in the width direction of the recording medium. The recording speed of the line-type ink-jet recording apparatus is considerably faster than that of the serial-type ink-jet recording apparatus.

Figure 3:
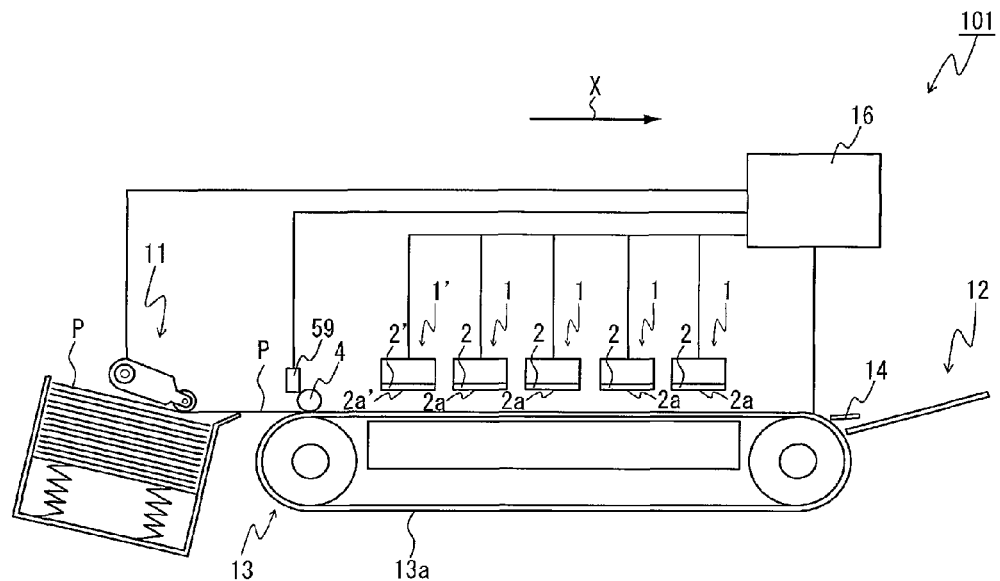
FIG. 3 is a block diagram showing an example of the configuration of the ink-jet recording apparatus.

As shown in FIG. 3, an ink-jet recording apparatus 101 is provided with a line-type ink-jet head and applies the pretreatment liquid onto a recording paper P by an ink-jet method. The ink-jet recording apparatus 101 comprises a pretreatment liquid cartridge 1', four ink cartridges 1, a pretreatment liquid head 2', four ink-jet heads 2, a paper feeding portion 11, a paper discharging portion 12, a belt transferring mechanism 13, and a control device 16 for controlling the whole ink-jet recording apparatus 101 as main components. The pretreatment liquid cartridge 1' has the same configuration as the ink cartridges 1. Likewise, the pretreatment liquid head 2' has the same configuration as the ink-jet heads 2. The paper feeding portion 11 is disposed at one side of the belt transferring mechanism 13 (left side in FIG. 3). The paper discharging portion 12 is disposed at the other side of the belt transferring mechanism 13 (right side in FIG. 3).

In the ink-jet recording apparatus 101, a recording paper transferring path is formed in which the recording paper P is transferred toward the paper discharging portion 12 from the paper feeding portion 11 through the belt transferring mechanism 13. The arrow X indicates a paper transferring direction in which the recording paper P is transferred. As the paper feeding portion 11, the belt transferring mechanism 13, and the paper discharging portion 12, for example, a conventionally known paper feeding portion, belt transferring mechanism, and paper discharging portion may be used (see JP2007-326242A). In FIG. 3, the numeral 59 indicates a recording paper detection sensor. The recording paper detection sensor 59 detects whether or not the recording paper P fed from the paper feeding portion 11 reached a recording waiting position located at the upstream side (left side in FIG. 3) of the belt transferring mechanism 13 in the recording paper transferring direction X.

In FIG. 3, the numeral 4 indicates a nip roller. The nip roller 4 presses the recording paper P to a circumferential surface 13a of the belt transferring mechanism 13 when the recording paper P fed into the belt transferring mechanism 13 is placed on the circumferential surface 13a of the belt transferring mechanism 13. At the downstream side of the belt transferring mechanism 13, a detaching mechanism 14 is provided. The detaching mechanism 14 detaches the recording paper P, which is adhered to the circumferential surface 13a of the belt transferring mechanism 13, from the circumferential surface 13a and sends the recording paper P toward the paper discharging portion 12.

The pretreatment liquid cartridge 1' contains the pretreatment liquid. The four ink cartridges 1 contain inks of four colors, namely, yellow, magenta, cyan, and black, respectively. For example, the black ink is the aforementioned pigment ink. The pretreatment liquid cartridge 1' and the four ink cartridges 1 are fixed side by side above the belt transferring mechanism 13 along the recording paper transferring direction X. The pretreatment liquid cartridge 1' and the four ink cartridges 1 respectively have the pretreatment liquid head 2' and the ink-jet heads 2 at the lower side thereof. When the recording paper P, which is transferred by the belt transferring mechanism 13, passes through under the pretreatment liquid head 2', the pretreatment liquid is ejected onto the recording surface of the recording paper P from a pretreatment liquid ejecting surface 2a'. Subsequently, when the recording paper P, which is transferred by the belt transferring mechanism 13, passes through under the four ink-jet heads 2 in order, each color of ink is ejected from each ink ejecting surface 2a. In this manner, recording is performed on the recording surface of the recording paper P.

Figure 4:
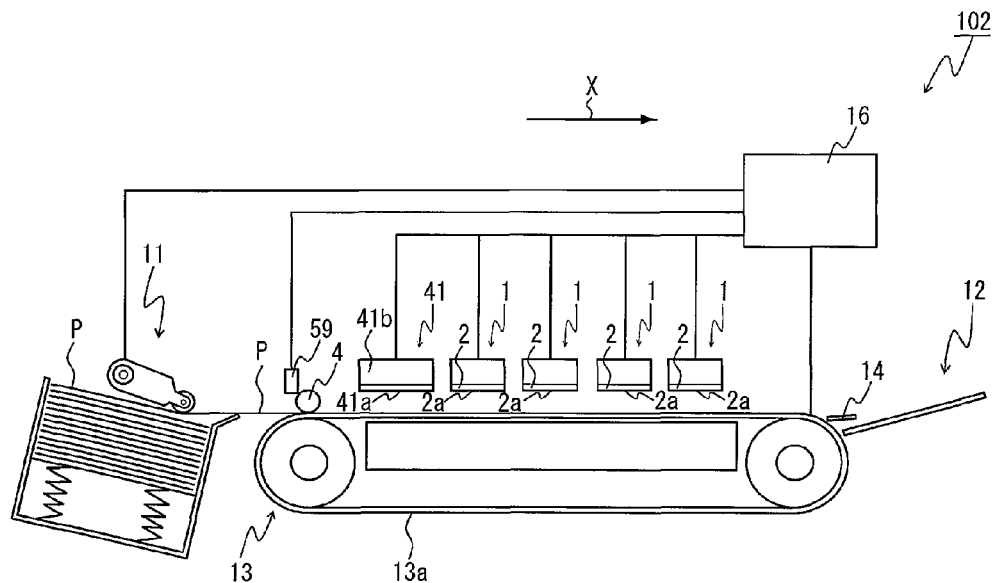
FIG. 4 is a block diagram showing another example of the configuration of the ink-jet recording apparatus.

Another example of the configuration of the ink-jet recording apparatus is shown in FIG. 4. In FIG. 4, identical parts to those shown in FIG. 3 are indicated with identical numerals and symbols. An ink-jet recording apparatus 102 of this example applies the pretreatment liquid onto the recording surface of the recording paper P by stamping. Therefore, in the ink-jet recording apparatus 102 of this example, units for applying the pretreatment liquid by an ink-jet method (pretreatment liquid cartridge 1' and pretreatment liquid head 2' in FIG. 3) are not provided. Other than these, the configuration of the ink-jet recording apparatus 102 of this example is similar to that of the ink-jet recording apparatus shown in FIG. 3.

As shown in FIG. 4, in the ink-jet recording apparatus 102 of this example, a stamp 41 is disposed at the position where the pretreatment liquid cartridge 1' and the pretreatment liquid head 2' in FIG. 3 are disposed. The stamp 41 has a stamping portion 41a and a pretreatment liquid storing portion 41b. The stamping portion 41a is formed of a superabsorbent substrate having flexibility. When recording is performed, the stamping portion 41a is brought into contact with the recording surface of the recording paper P and the pretreatment liquid supplied from the pretreatment liquid storing portion 41b is applied onto the recording surface of the recording paper P.

In the ink-jet recording apparatuses shown in FIGS. 3 and 4, the pretreatment liquid is applied onto the recording surface of the recording paper P by an ink-jet method and a stamping method. However, the ink-jet recording apparatus is not limited thereto. In the ink-jet recording apparatus, the pretreatment liquid may be applied onto the recording surface of the recording paper P by a brushing method, a rolling method, or the like. Further, in the ink-jet recording apparatuses shown in FIGS. 3 and 4, a line-type ink-jet head is employed. However, the ink-jet recording apparatus is not limited thereto, and may be an apparatus employing a serial-type ink-jet head.

EXAMPLES

Examples of the present invention are described together with Comparative Examples. However, the present invention is neither limited nor restricted by the following Examples or Comparative Examples.

<Preparation of Pretreatment Liquid>

Pretreatment liquid components (Tables 1, 2, 3, and 4) were uniformly mixed to prepare pretreatment liquids of Examples 1 to 20 and Comparative Examples 1 to 31.

<Preparation of Pigment Ink>

Pigment ink components (Table 5) excluding "CAB-O-JET® 300" were uniformly mixed to prepare an ink solvent. Then, the ink solvent was gradually added to "CAB-O-JET® 300" and mixed uniformly. Thereafter, thus obtained mixture was filtered with a cellulose acetate type membrane filter having a pore diameter of 3.00 μm manufactured by Toyo Roshi Kaisha, Ltd. Thus, a pigment ink for ink-jet recording was obtained.

The optical density in Examples and Comparative Examples was measured and evaluated according to the following method.

On a film ("OHP film, Multi-Purpose Transparency Film CG6000", manufactured by 3M), a pretreatment liquid of each Example and Comparative Example was uniformly spread using a barcoater (BARCOATER rod No. 8, manufactured by Yasuda Seiki seisakusho LTD.). Next, a recording paper was placed on the film with the recording surface down. Then, the recording surface of the recording paper was brought into contact with the pretreatment liquid on the film and the pretreatment liquid was absorbed by the recording surface, and thereby the pretreatment liquid was applied to the recording paper. The average amount of the pretreatment liquid applied to the recording paper (average application amount) was $2.5 \times 10^{-5}$ g/mm$^2$. As for the recording paper, a plain paper ("Laser Print", manufactured by Hammermill) was used.

Subsequently, an ink cartridge mountable to an ink-jet multifunction printer called "DCP-330C" manufactured by Brother Industries, Ltd. was filled with the pigment ink. Then, using the ink-jet multifunction printer, with respect to recording surfaces of recording papers each pretreated with the pretreatment liquids of Examples and Comparative Examples, by performing solid printing using the pigment ink with coverage of 100% and resolution of 600 dpi×600 dpi, recording by an ink-jet method was performed. Further, as Control Example, with respect to a recording surface of a recording paper not applied with the pretreatment liquid, recording was performed with the pigment ink by the ink-jet method in the same manner as in Examples and Comparative Examples. The optical density (OD) values of the recording areas of the recording papers were measured with a spectrophotometer, Spectrolino, manufactured by Gretag-Macbeth (light source: $D_{50}$; observer: 2°; and filter: status T), and evaluated according to the following Evaluation Criteria.

Evaluation Criteria for Optical Density

A: OD value≥1.35
B: 1.3≤OD value<1.35
C: OD value<1.3

The pretreatment liquid compositions and the evaluation results of Examples are summarized in Tables 1 and 2. The pretreatment liquid compositions and the evaluation results of Comparative Examples as well as the evaluation result of Control Example are summarized in Tables 3 and 4. The composition of the pigment ink used in the evaluation test for the optical density is summarized in Table 5.

TABLE 1

|  |  | Example |  |  |  |  |  |  |  |  |  |
|---|---|---|---|---|---|---|---|---|---|---|---|
|  |  | 1 | 2 | 3 | 4 | 5 | 6 | 7 | 8 | 9 | 10 |
| Component (i) | Succinic acid | 4 | 4 | 4 | 4 | 4 | — | — | — | — | — |
|  | Acetic acid | — | — | — | — | — | 4 | 4 | 4 | 4 | 4 |
| Component (ii) | NaI (*1) | 4 | — | — | — | — | 4 | — | — | — | — |
|  | NaCl (*2) | — | 4 | — | — | — | — | 4 | — | — | — |
|  | KI (*3) | — | — | 4 | — | — | — | — | 4 | — | — |
|  | KCl (*4) | — | — | — | 4 | — | — | — | — | 4 | — |
|  | LiCl (*5) | — | — | — | — | 4 | — | — | — | — | 4 |
| Glycol ether | DPP (*6) | 10 | 10 | 10 | 10 | 10 | 10 | 10 | 10 | 10 | 10 |
|  | DEHE (*7) | — | — | — | — | — | — | — | — | — | — |
|  | BTG (*8) | — | — | — | — | — | — | — | — | — | — |
| Humectant | DPG (*9) | 10 | 10 | 10 | 10 | 10 | 10 | 10 | 10 | 10 | 10 |
| Water |  | balance | balance | balance | balance | balance | balance | balance | balance | balance | balance |
| Evaluation | Optical Density | A | B | B | A | A | A | A | A | A | A |
|  | OD value | 1.38 | 1.34 | 1.34 | 1.37 | 1.37 | 1.40 | 1.39 | 1.41 | 1.39 | 1.39 |

Amounts of components (i) and (ii), glycol ether, and humectant are expressed in wt %

TABLE 2

|  |  | Example |  |  |  |  |  |  |  |  |  |
|---|---|---|---|---|---|---|---|---|---|---|---|
|  |  | 11 | 12 | 13 | 14 | 15 | 16 | 17 | 18 | 19 | 20 |
| Component (i) | Succinic acid | 4 | 4 | — | — | 1 | 2 | — | — | 2 | 2 |
|  | Acetic acid | — | — | 4 | 4 | — | — | 1 | 2 | 2 | 2 |
| Component (ii) | NaI (*1) | — | — | — | — | 2 | 1 | — | — | 4 | — |
|  | NaCl (*2) | — | — | — | — | — | — | 2 | 1 | — | — |
|  | KI (*3) | — | — | 4 | 4 | — | — | — | — | — | — |
|  | KCl (*4) | 4 | 4 | — | — | — | — | — | — | — | 4 |
|  | LiCl (*5) | — | — | — | — | — | — | — | — | — | — |
| Glycol ether | DPP (*6) | — | — | — | — | 10 | 10 | 10 | 10 | 10 | 10 |
|  | DEHE (*7) | 5 | — | 5 | — | — | — | — | — | — | — |
|  | BTG (*8) | — | 10 | — | 10 | — | — | — | — | — | — |
| Humectant | DPG (*9) | 10 | 10 | 10 | 10 | 10 | 10 | 10 | 10 | 10 | 10 |
| Water |  | balance | balance | balance | balance | balance | balance | balance | balance | balance | balance |
| Evaluation | Optical Density | A | B | A | A | A | A | A | A | A | A |
|  | OD value | 1.36 | 1.34 | 1.40 | 1.36 | 1.39 | 1.40 | 1.39 | 1.38 | 1.39 | 1.41 |

Amounts of components (i) and (ii), glycol ether, and humectant are expressed in wt %

TABLE 3

|  |  | Comparative Example |  |  |  |  |  |  |  |  |  |  |  |  |  |  |  |
|---|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 | 15 | 16 |
| Acid | Succinic acid | 2 | 4 | 8 | — | — | — | — | — | — | — | — | — | — | — | — | — |
|  | Acetic acid | — | — | — | 1 | 2 | 4 | 8 | — | — | — | — | — | — | — | — | — |
|  | Sodium acetate | — | — | — | — | — | — | — | — | — | — | — | — | — | — | — | — |
|  | Citric acid monohydrate | — | — | — | — | — | — | — | — | — | — | — | — | — | — | — | — |
|  | Acidum tartaricum | — | — | — | — | — | — | — | — | — | — | — | — | — | — | — | — |
|  | 1N sulfuric acid (*10) | — | — | — | — | — | — | — | — | — | — | — | — | — | — | — | — |
| Metal halide | NaI (*1) | — | — | — | — | — | — | — | 1 | 2 | 4 | 8 | — | — | — | — | — |
|  | NaCl (*2) | — | — | — | — | — | — | — | — | — | — | — | 1 | 2 | 4 | 8 | — |
|  | KI (*3) | — | — | — | — | — | — | — | — | — | — | — | — | — | — | — | 4 |
|  | KCl (*4) | — | — | — | — | — | — | — | — | — | — | — | — | — | — | — | — |
|  | LiCl (*5) | — | — | — | — | — | — | — | — | — | — | — | — | — | — | — | — |
|  | Na$_2$SO$_4$ (*11) | — | — | — | — | — | — | — | — | — | — | — | — | — | — | — | — |
|  | MgSO$_4$ (*12) | — | — | — | — | — | — | — | — | — | — | — | — | — | — | — | — |
| Glycol ether | DPP (*6) | 10 | 10 | 10 | 10 | 10 | 10 | 10 | 10 | 10 | 10 | 10 | 10 | 10 | 10 | 10 | 10 |
|  | DEHE (*7) | — | — | — | — | — | — | — | — | — | — | — | — | — | — | — | — |
|  | BTG (*8) | — | — | — | — | — | — | — | — | — | — | — | — | — | — | — | — |
| Humectant | DPG (*9) | 10 | 10 | 10 | 10 | 10 | 10 | 10 | 10 | 10 | 10 | 10 | 10 | 10 | 10 | 10 | 10 |
| Water |  | balance | balance | balance | balance | balance | balance | balance | balance | balance | balance | balance | balance | balance | balance | balance | balance |
| Evaluation | Optical Density | C | C | B | C | C | C | B | C | C | C | C | C | C | C | C | C |
|  | OD value | 1.25 | 1.27 | 1.31 | 1.29 | 1.28 | 1.29 | 1.30 | 1.23 | 1.22 | 1.24 | 1.27 | 1.28 | 1.28 | 1.29 | 1 29 | 1.25 |

Amounts of acid, metal halide, glycol ether, and humectant are expressed in wt %

TABLE 4

| | | Comparative Example | | | | | | | | | | | | | | | Control |
|---|---|---|---|---|---|---|---|---|---|---|---|---|---|---|---|---|
| | | 17 | 18 | 19 | 20 | 21 | 22 | 23 | 24 | 25 | 26 | 27 | 28 | 29 | 30 | 31 | Example |
| Acid | Succinic acid | — | — | — | — | — | 4 | — | — | — | 4 | — | — | — | — | — | — |
| | Acetic acid | — | — | — | — | — | — | 4 | — | — | — | 4 | — | — | — | — | |
| | Sodium acetate | — | — | — | — | — | — | — | — | — | — | — | — | 4 | 4 | 4 | |
| | Citric acid monohydrate | — | — | 4 | — | — | — | — | 4 | — | — | — | 4 | — | — | — | |
| | Acidum tartaricum | — | — | — | 4 | — | — | — | — | — | — | — | — | — | — | — | |
| | 1N sulfuric acid (*10) | — | — | — | — | 4 | — | — | — | 4 | — | — | — | — | — | — | |
| Metal halide | NaI (*1) | — | — | 4 | — | — | — | — | 4 | — | — | — | — | — | — | — | |
| | NaCl (*2) | — | — | — | 4 | — | — | — | — | — | — | — | — | — | 4 | — | |
| | KI (*3) | — | — | — | — | — | — | — | — | — | — | — | — | — | — | 4 | |
| | KCl (*4) | 4 | — | — | — | — | — | — | — | — | — | — | — | — | — | — | |
| | LiCl (*5) | — | 4 | — | — | 4 | — | — | — | 4 | — | — | — | — | — | — | |
| | Na$_2$SO$_4$ (*11) | — | — | — | — | — | 4 | — | — | — | 4 | — | 4 | — | — | — | |
| | MgSO$_4$ (*12) | — | — | — | — | — | — | 4 | — | — | — | 4 | — | — | — | — | |
| Glycol ether | DPP (*6) | 10 | 10 | 10 | 10 | 10 | 10 | 10 | — | — | — | — | 10 | 10 | 10 | 10 | |
| | DEHE (*7) | — | — | — | — | — | — | — | 5 | — | 5 | — | — | — | — | — | |
| | BTG (*8) | — | — | — | — | — | — | — | — | 10 | — | 10 | — | — | — | — | |
| Humectant | DPG (*9) | 10 | 10 | 10 | 10 | 10 | 10 | 10 | 10 | 10 | 10 | 10 | 10 | 10 | 10 | 10 | |
| Water | | balance | balance | balance | balance | balance | balance | balance | balance | balance | balance | balance | balance | balance | balance | balance | |
| Evaluation | Optical Density | C | C | C | C | C | C | C | C | C | C | C | C | C | C | C | C |
| | OD value | 1.28 | 1.28 | 1.23 | 1.24 | 1.23 | 1.23 | 1.21 | 1.22 | 1.25 | 1.23 | 1.23 | 1.24 | 1.26 | 1.27 | 1.26 | 1.17 |

Amounts of acid, metal halide, glycol ether, and humectant are expressed in wt %

TABLE 5

| | Ink composition (wt %) |
|---|---|
| CAB-O-JET ® 300 (*13) | 40 |
| Glycerin | 33.15 |
| DPP (*6) | 2.0 |
| OLFIN ® E1010 (*14) | 0.7 |
| SUNNOL ® L1430 (*15) | 1.42 |
| Water | Balance |

Footnotes of Tables 1 to 5
1: NaI=sodium iodide
2: NaCl=sodium chloride
3: KI=potassium iodide
4: KCl=potassium chloride
5: LiCl=lithium chloride
6: DPP=dipropylene glycol-n-propyl ether
7: DEHE=diethylene glycol-n-hexyl ether
8: BTG triethylene glycol-n-butyl ether
9: DPG=dipropylene glycol
10: 1N sulfuric acid=1 normal sulfuric acid (hydrogen-ion concentration of 2mol/L)
11: Na$_2$SO$_4$=sodium sulfate
12: MgSO$_4$=magnesium sulfate
13: Manufactured by Cabot Specialty Chemicals, Inc.; carbon black concentration=15 %; ink conversion concentration (carbon black concentration in total amount of ink=6 wt %)
14: Acetylene glycol surfactant (ethylene oxide (10 mol) additive of acetylene diol, manufactured by Nissin Chemical Industry Co., Ltd, active ingredient amount=100 wt %)
15: Polyoxyethylene (3E.O.) alkyl (C=12, 13) ether sodium sulfate, manufactured by Lion Corporation, active ingredient amount=28 wt %

As summarized in Tables 1 and 2, in cases of using the pretreatment liquids of Examples 1 to 20, the results of the evaluation for the optical density were good. It is to be noted that Examples 4 and 11 in which DPP and DEHE were used as glycol ether showed higher optical densities than Example 12 having the same pretreatment liquid composition except that BTG was used instead of DPP and DEHE. Similarly, Examples 8 and 13 in which DPP and DEHE were used as glycol ether showed higher optical densities than Example 14 having the same pretreatment liquid composition except that BTG was used instead of DPP and DEHE. Further, in spite of the fact that the total amounts of the components (i) and (ii) are small as 3 wt %, Examples 15 to 18 showed higher optical densities. Moreover, Examples 19 and 20 in which a succinic acid and an acetic acid were used in combination as the component (i) also showed higher optical densities as in the case of other Examples in which a succinic acid or an acetic acid was used alone.

In contrast, as summarized in Tables 3 and 4, in cases of using the pretreatment liquids of Comparative Examples 1 to 31, the results of the evaluation for the optical density were inferior to those of Examples although the optical densities were higher than Control Example. It is to be noted that also in Comparative Examples 30 and 31 in which sodium acetate was used instead of the component (i), similar to other Comparative Examples, improvement in the optical density was inferior to Examples.

It will be obvious to those having skill in the art that many changes may be made in the above-described details of the particular aspects described herein without departing from the spirit or scope of the invention as defined in the appended claims.

What is claimed is:
1. A pretreatment liquid adapted to be applied onto a recording medium in advance of ink-jet recording during which a pigment ink is applied to the recording medium, wherein the pretreatment liquid comprises one of the following components (i)-(xiii), and water:
   Component (i):
      a combination of about 1 wt. % to about 4 wt. % succinic acid, about 10 wt. % of dipropylene glycol-n-propyl ether, and about 1 wt. % to about 4 wt. % of NaI;

Component (ii):
  a combination of about 4 wt. % succinic acid, about 10 wt. % of dipropylene glycol-n-propyl ether, and about 4 wt. % of KCl;
Component (iii):
  a combination of about 4 wt. % succinic acid, about 10 wt. % of dipropylene glycol-n-propyl ether, and about 4 wt. % of LiCl;
Component (iv):
  a combination of about 4 wt. % acetic acid, about 10 wt. % of dipropylene glycol-n-propyl ether, and about 4 wt. % of NaI;
Component (v):
  a combination of about 1 wt. % to about 4 wt. % acetic acid, about 10 wt. % of dipropylene glycol-n-propyl ether, and about 1 wt. % to about 4 wt. % of NaCl;
Component (vi):
  a combination of about 4 wt. % acetic acid, about 10 wt. % of dipropylene glycol-n-propyl ether, and about 4 wt. % of KI;
Component (vii):
  a combination of about 4 wt. % acetic acid, about 10 wt. % of dipropylene glycol-n-propyl ether, and about 4 wt. % of KCl;
Component (viii):
  a combination of about 4 wt. % acetic acid, about 10 wt. % of dipropylene glycol-n-propyl ether, and about 4 wt. % of LiCl;
Component (ix):
  a combination of about 4 wt. % succinic acid, about 5 wt. % of diethylene glycol-n-hexyl ether, and about 4 wt. % of KCl;
Component (x):
  a combination of about 4 wt. % acetic acid, about 5 wt. % of diethylene glycol-n-hexyl ether, and about 4 wt. % of KI;
Component (xi):
  a combination of about 4 wt. % acetic acid, about 10 wt. % of triethylene glycol-n-butyl ether, and about 4 wt. % of KI;
Component (xii):
  a combination of about 2 wt. % succinic acid, about 2 wt. % acetic acid, about 10 wt. % of dipropylene glycol-n-propyl ether, and about 4 wt. % of NaI; and
Component (xiii):
  a combination of about 2 wt. % succinic acid, about 2 wt. % acetic acid, about 10 wt. % of dipropylene glycol-n-propyl ether, and about 4 wt. % of KCl.

2. The pretreatment liquid according to claim 1, wherein the pigment ink comprises a self-dispersed pigment.

3. An ink set comprising a pigment ink and a pretreatment liquid, wherein the pretreatment liquid is the pretreatment liquid according to claim 1.

4. The pretreatment liquid according to claim 1, wherein the pretreatment liquid comprises one of the following Component (i)(A)-(i)(C), and water:
Component (i)(A):
  a combination of about 4 wt. % succinic acid, about 10 wt. % of dipropylene glycol-n-propyl ether, and about 4 wt. % of NaI;
Component (i)(B):
  a combination of about 1 wt. % succinic acid, about 10 wt. % of dipropylene glycol-n-propyl ether, and about 2 wt. % of NaI; and
Component (i)(C):
  a combination of about 2 wt. % succinic acid, about 10 wt. % of dipropylene glycol-n-propyl ether, and about 1 wt. % of NaI.

5. The pretreatment liquid according to claim 1, wherein the pretreatment liquid comprises the following Component (ii), and water:
Component (ii):
  a combination of about 4 wt. % succinic acid, about 10 wt. % of dipropylene glycol-n-propyl ether, and about 4 wt. % of KCl.

6. The pretreatment liquid according to claim 1, wherein the pretreatment liquid comprises the following Component (iii), and water:
Component (iii):
  a combination of about 4 wt. % succinic acid, about 10 wt. % of dipropylene glycol-n-propyl ether, and about 4 wt. % of LiCl.

7. The pretreatment liquid according to claim 1, wherein the pretreatment liquid comprises the following Component (iv), and water:
Component (iv):
  a combination of about 4 wt. % acetic acid, about 10 wt. % of dipropylene glycol-n-propyl ether, and about 4 wt. % of NaI.

8. The pretreatment liquid according to claim 1, wherein the pretreatment liquid comprises one of the following Component (v)(A)-(v)(C), and water:
Component (v)(A):
  a combination of about 4 wt. % acetic acid, about 10 wt. % of dipropylene glycol-n-propyl ether, and about 4 wt. % of NaCl;
Component (v)(B):
  a combination of about 1 wt. % acetic acid, about 10 wt. % of dipropylene glycol-n-propyl ether, and about 2 wt. % of NaCl; and
Component (v)(C):
  a combination of about 2 wt. % acetic acid, about 10 wt. % of dipropylene glycol-n-propyl ether, and about 1 wt. % of NaCl.

9. The pretreatment liquid according to claim 1, wherein the pretreatment liquid comprises the following Component (vi), and water:
Component (vi):
  a combination of about 4 wt. % acetic acid, about 10 wt. % of dipropylene glycol-n-propyl ether, and about 4 wt. % of KI.

10. The pretreatment liquid according to claim 1, wherein the pretreatment liquid comprises the following Component (vii), and water:
Component (vii):
  a combination of about 4 wt. % acetic acid, about 10 wt. % of dipropylene glycol-n-propyl ether, and about 4 wt. % of KCl.

11. The pretreatment liquid according to claim 1, wherein the pretreatment liquid comprises the following Component (viii), and water:
Component (viii):
  a combination of about 4 wt. % acetic acid, about 10 wt. % of dipropylene glycol-n-propyl ether, and about 4 wt. % of LiCl.

12. The pretreatment liquid according to claim 1, wherein the pretreatment liquid comprises the following Component (ix), and water:

Component (ix):
a combination of about 4 wt. % succinic acid, about 5 wt. % of diethylene glycol-n-hexyl ether, and about 4 wt. % of KCl.

13. The pretreatment liquid according to claim 1, wherein the pretreatment liquid comprises the following Component (x), and water:
Component (x):
a combination of about 4 wt. % acetic acid, about 5 wt. % of diethylene glycol-n-hexyl ether, and about 4 wt. % of KI.

14. The pretreatment liquid according to claim 1, wherein the pretreatment liquid comprises the following Component (xi), and water:
Component (xi):
a combination of about 4 wt. % acetic acid, about 10 wt. % of triethylene glycol-n-butyl ether, and about 4 wt. % of KI.

15. The pretreatment liquid according to claim 1, wherein the pretreatment liquid comprises the following Component (xii), and water:
Component (xii):
a combination of about 2 wt. % succinic acid, about 2 wt. % acetic acid, about 10 wt. % of dipropylene glycol-n-propyl ether, and about 4 wt. % of NaI.

16. The pretreatment liquid according to claim 7, wherein the pretreatment liquid comprises the following Component (xiii), and water:
Component (xiii):
a combination of about 2 wt. % succinic acid, about 2 wt. % acetic acid, about 10 wt. % of dipropylene glycol-n-propyl ether, and about 4 wt. % of KCl.

* * * * *

UNITED STATES PATENT AND TRADEMARK OFFICE
CERTIFICATE OF CORRECTION

| | | |
|---|---|---|
| PATENT NO. | : 8,691,004 B2 | Page 1 of 1 |
| APPLICATION NO. | : 12/726368 | |
| DATED | : April 8, 2014 | |
| INVENTOR(S) | : Tahara et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 448 days.

Signed and Sealed this
Twenty-fifth Day of August, 2015

Michelle K. Lee
*Director of the United States Patent and Trademark Office*